United States Patent
Kawano

(10) Patent No.: US 9,607,013 B2
(45) Date of Patent: Mar. 28, 2017

(54) IMAGE MANAGEMENT APPARATUS, MANAGEMENT METHOD, AND STORAGE MEDIUM

(71) Applicant: CANON KABUSHIKI KAISHA, Tokyo (JP)

(72) Inventor: Atsushi Kawano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 13/965,449

(22) Filed: Aug. 13, 2013

(65) Prior Publication Data

US 2014/0079340 A1    Mar. 20, 2014

(30) Foreign Application Priority Data

Sep. 14, 2012    (JP) ................................. 2012-203538

(51) Int. Cl.
*G06K 9/36* (2006.01)
*G06F 17/30* (2006.01)
(Continued)

(52) U.S. Cl.
CPC ......... *G06F 17/30265* (2013.01); *H04N 5/76* (2013.01); *H04N 21/8133* (2013.01);
(Continued)

(58) Field of Classification Search
CPC ............... H04N 21/84; H04N 21/8133; H04N 21/8549; H04N 5/76; H04N 9/8205; G06F 17/30265; G06F 17/3079; G06K 9/00771
See application file for complete search history.

(56) References Cited

U.S. PATENT DOCUMENTS 7,460,601 B2   12/2008   Taniguchi
7,983,528 B2   7/2011   Sohma et al.
(Continued)

FOREIGN PATENT DOCUMENTS

CN    1640125 A   7/2005
CN    101908057 A   12/2010
(Continued)

OTHER PUBLICATIONS

Japanese Official Action dated May 23, 2016, issued in corresponding Japanese Patent Application No. 2012-203538.
(Continued)

*Primary Examiner* — Li Liu
(74) *Attorney, Agent, or Firm* — Fitzpatrick, Cella, Harper & Scinto

(57) ABSTRACT

An image management apparatus includes at least one processor coupled to a memory. An obtaining unit obtains a plurality of metadata corresponding to a plurality of image data, respectively. A generation unit generates, from the plurality of metadata respectively corresponding to the plurality of image data, a plurality of first summary metadata respectively corresponding to a plurality of groups of metadata into which the plurality of metadata are grouped, and generates, from the plurality of first summary metadata, second summary metadata corresponding to a group of the plurality of first summary metadata into which the plurality of first summary metadata are grouped.

22 Claims, 10 Drawing Sheets

(51) Int. Cl.
    *H04N 5/76*      (2006.01)
    *H04N 21/81*     (2011.01)
    *H04N 21/84*     (2011.01)
    *H04N 21/8549*   (2011.01)
    *H04N 9/82*      (2006.01)

(52) U.S. Cl.
    CPC ......... *H04N 21/84* (2013.01); *H04N 21/8549* (2013.01); *H04N 9/8205* (2013.01)

(56) References Cited

U.S. PATENT DOCUMENTS

| | | | |
|---|---|---|---|
| 8,290,957 B2 | 10/2012 | Sorakado | |
| 8,620,920 B2 | 12/2013 | Sorakado | |
| 2001/0056506 A1* | 12/2001 | Munetsugu | G06F 17/30017 719/310 |
| 2003/0093810 A1* | 5/2003 | Taniguchi | G08B 13/19656 725/112 |
| 2004/0052505 A1* | 3/2004 | Ahmad | G11B 27/034 386/202 |
| 2007/0100851 A1* | 5/2007 | Golovchinsky | G06F 17/30817 |
| 2007/0112844 A1 | 5/2007 | Tribble et al. | |
| 2008/0024610 A1* | 1/2008 | Konishi | G08B 13/19652 348/159 |
| 2010/0138420 A1* | 6/2010 | Bator | G06F 17/30572 707/737 |
| 2010/0138431 A1 | 6/2010 | Bator et al. | |
| 2010/0201815 A1* | 8/2010 | Anderson | G06K 9/00771 348/148 |
| 2010/0287473 A1* | 11/2010 | Recesso | G09B 7/00 715/716 |
| 2012/0173577 A1* | 7/2012 | Millar | G06F 17/3079 707/780 |

FOREIGN PATENT DOCUMENTS

| | | |
|---|---|---|
| CN | 102239468 A | 11/2011 |
| JP | 2003-134435 A | 5/2003 |
| JP | 2004-112005 A | 4/2004 |
| JP | 2008-035095 A | 2/2008 |
| JP | 4099973 B | 6/2008 |

OTHER PUBLICATIONS

Chinese Office Action dated May 4, 2016, issued in corresponding Chinese Patent Application No. 201310409985.9, with an English translation.

English translation of Japanese Official Action dated May 23, 2016, issued in corresponding Japanese Patent Application No. 2012-203538.

\* cited by examiner

FIG. 2

```xml
<summary>
  <range>1000-1300</range>
  <event>
    <tripwire>1</tripwire>
    <abandoned>1</abandoned>
  </event>
  <object>
    <human gender="male">4</human>
    <human gender="female">3</human>
    <animal type="cat">2</animal>
    <other>4</other>
  </object>
  <area>
    <areaid="1">
      <x0>400</x0>
      <y0>50</y0>
      <x1>580</x1>
      <y1>130</y1>
      <events>abandoned</events>
      <objects>human,other</objects>
    </area>
    <areaid="2">
      <x0>0</x0>
      <y0>230</y0>
      <x1>170</x1>
      <y1>320</y1>
      <events>tripwire</events>
      <objects>human,animal</objects>
    </area>
  </area>
</summary>
```

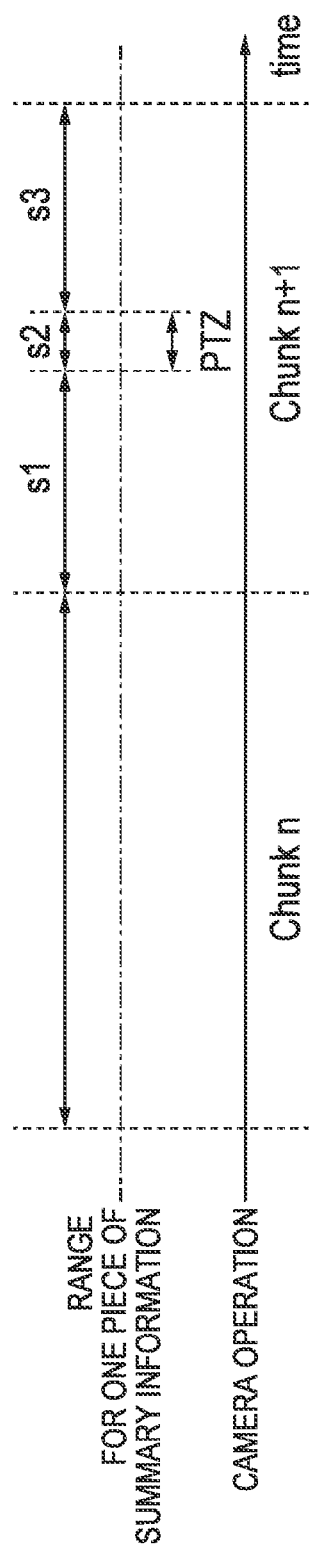

FIG. 7A

```
<summary>
  <metadata name=00001.meta>
    <tripwire>1</tripwire>
    <abandoned>1</abandoned>
    <ptz>0</ptz>
  </metadata>
  <metadata name=00002.meta>
    <tripwire>0</tripwire>
    <abandoned>0</abandoned>
    <ptz>0</ptz>
  </metadata>
  <metadata name=00003.meta>
    <tripwire>0</tripwire>
    <abandoned>1</abandoned>
    <ptz>1</ptz>
  </metadata>
</summary>
```

FIG. 7B

```
<summary>
  <metadata name=000>
    <tripwire>1</tripwire>
    <abandoned>1</abandoned>
    <ptz>0</ptz>
  </metadata>
  <metadata name=001>
    <tripwire>0</tripwire>
    <abandoned>0</abandoned>
    <ptz>0</ptz>
  </metadata>
  <metadata name=002>
    <tripwire>0</tripwire>
    <abandoned>0</abandoned>
    <ptz>0</ptz>
  </metadata>
</summary>
```

IMAGE MANAGEMENT APPARATUS, MANAGEMENT METHOD, AND STORAGE MEDIUM

CLAIM OF PRIORITY

This application claims the benefit of Japanese Patent Application No. 2012-203538, filed Sep. 14, 2012, which is hereby incorporated by reference herein in its entirety.

BACKGROUND OF THE INVENTION

Field of the Invention

The present invention relates to an image management apparatus and a management method.

Description of the Related Art

If movies shot by a monitoring camera are continuously recorded in a recording apparatus, the data amount of the movies recorded in the recording apparatus becomes enormous. To efficiently detect and to check abnormal circumstances from the enormous amount of recorded movies, some monitoring camera systems execute video analysis processing, and perform processing of assigning predetermined information to a movie. As a technique of assigning predetermined information to a movie, there are provided techniques described in, for example, Japanese Patent Laid-Open No. 2004-112005 and U.S. Pat. No. 7,460,601.

Japanese Patent Laid-Open No. 2004-112005 describes an image recording apparatus that records, if a change occurs in continuous image data shot by a camera, the change level and changed portion as index information. To play back the recorded images, the image recording apparatus described in Japanese Patent Laid-Open No. 2004-112005 refers to the index information, and plays back only the changed portion. According to this technique, it is possible to readily check images shot by a camera.

U.S. Pat. No. 7,460,601 describes a movie monitoring system in which a movie transmission apparatus divides movie data into predetermined units, assigns associated metadata to each divided movie data, and transmits the movie data and metadata to a movie reception apparatus. According to this technique, it is possible to improve the efficiency of an accumulation process and a search process.

In the techniques of the above-described patent literatures, by assigning predetermined information, such as metadata, to image data or movie data to be recorded, succeeding detection and checking processes are efficiently executed. In either of the patent literatures, however, the amount of information assigned to image data or movie data of a long time becomes enormous, and thus, the load of a search process cannot be sufficiently reduced.

SUMMARY OF THE INVENTION

The present invention reduces the processing load and allows an efficient search when searching assigned metadata to extract desired image data.

According to a first aspect, an image management apparatus comprises a generation unit configured to generate, from a plurality of metadata respectively corresponding to a plurality of images, summary data of the plurality of metadata, and a storage unit configured to store the summary data in association with the plurality of metadata.

According to a second aspect, a management method for an image management apparatus comprises generating, from a plurality of metadata respectively corresponding to a plurality of images, summary data of the plurality of metadata, and storing the summary data in association with the plurality of metadata.

Further features of the present invention will become apparent from the following description of exemplary embodiments with reference to the attached drawings.

BRIEF DESCRIPTION OF THE DRAWINGS

FIG. 2 is a view showing an example of summary information;

FIG. 4 is a timing chart showing a summary information creation method in PTZ;

FIG. 7A and FIG. 7B are views showing examples of layer summary information;

DESCRIPTION OF THE EMBODIMENTS

The present invention will be described in detail below based on some embodiments with reference to the accompanying drawings. Note that arrangements shown in the following embodiments are merely examples, and the present invention is not limited to them.

Figure 1:
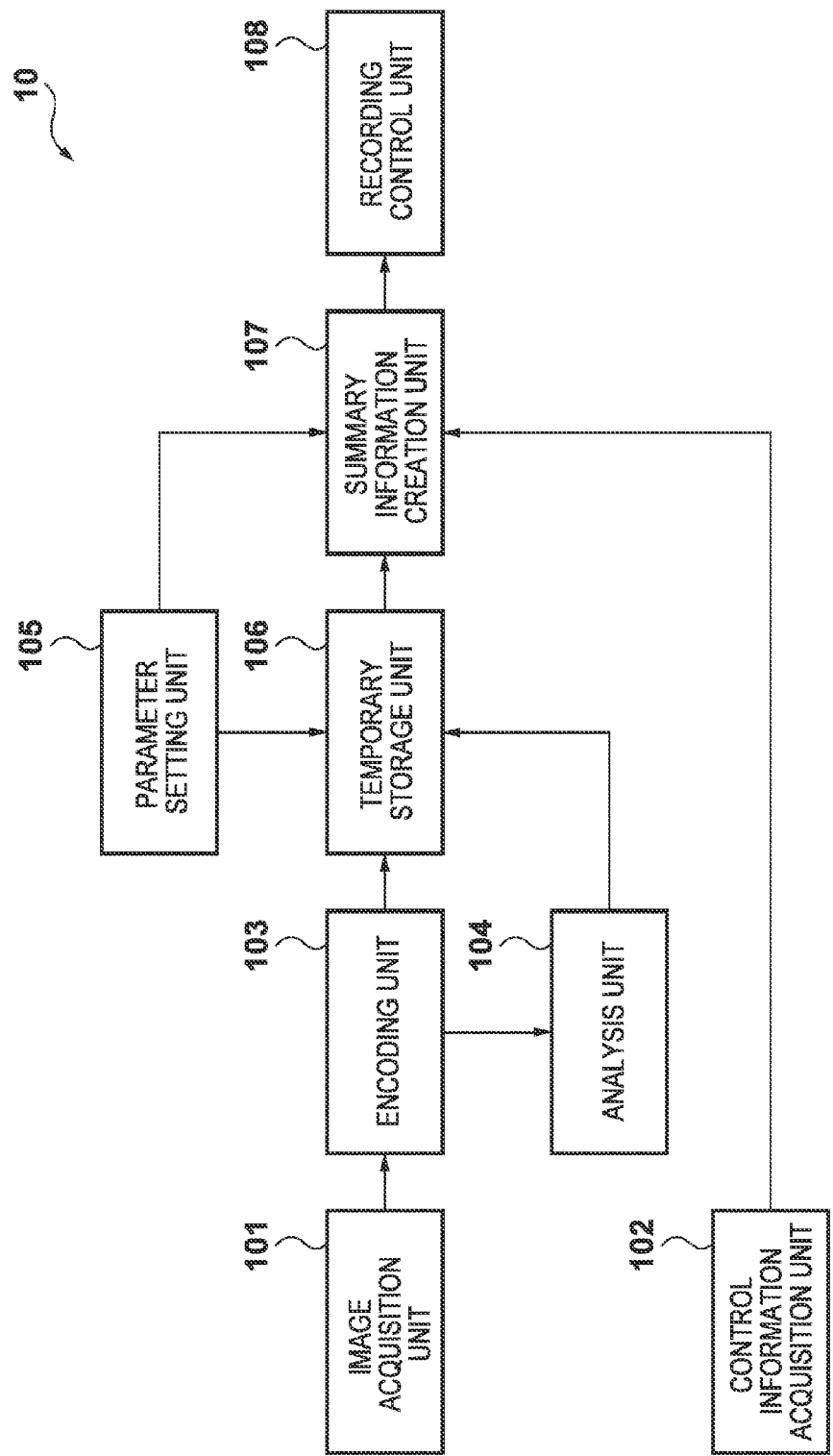
FIG. 1 is a block diagram showing the arrangement of an information processing apparatus.

FIG. 1 is a block diagram showing the arrangement of an information processing apparatus 10. The information processing apparatus 10 includes an image acquisition unit 101, a control information acquisition unit 102, an encoding unit 103, an analysis unit 104, a parameter setting unit 105, a temporary storage unit 106, a summary information creation unit 107, and a recording control unit 108.

The image acquisition unit 101 acquires an image from an external imaging apparatus (not shown). Note that the information processing apparatus 10 may incorporate an imaging apparatus. The image acquisition unit 101 acquires images from the imaging apparatus in, for example, a time sequence. The image acquisition unit 101 also assigns, to the plurality of acquired images, image IDs for identifying them, respectively. Alternatively, the image acquisition unit 101 may acquire images assigned image IDs from the imaging apparatus. Note that the images acquired by the image acquisition unit 101 are not limited to images captured by the external imaging apparatus, and may be images saved in an external server or an external memory.

The control information acquisition unit 102 acquires pan/tilt/zoom information of a camera from the external imaging apparatus (not shown). The information acquired by the control information acquisition unit 102 is not limited to the pan/tilt/zoom information of the camera, and may be any information acquirable from the camera, such as white balance or exposure change information. In a mode in which summary information is not divided for each piece of control information, the control information acquisition unit 102 is not necessary.

The encoding unit 103 encodes each of continuous images acquired by the image acquisition unit 101 in an H.264 format, and creates a gray image by extracting only luminance values. Note that the encoding processing by the encoding unit 103 is not limited to the H.264 format, and may be any encoding processing that can encode continuous images in, for example, a continuous JPEG or MPEG-2 format.

The analysis unit 104 uses the gray images created by the encoding unit 103 to detect a moving object or a stationary object by a background subtraction method. Furthermore, the analysis unit 104 assigns an ID (object ID) to an object identified based on the positional relationship of the detected object between frames, and executes processing of tracking the object. Based on the characteristics of the shape and behavior pattern of each object, the unit 104 assigns a human (male or female) attribute, a stationary object attribute, or another attribute. The unit 104 also detects the shape, position, size, movement locus, and the like, of each object.

Moreover, the analysis unit 104 detects an event (tripwire event) in which the movement locus of an object passes through a specific location on a screen, and an event (abandoned event) in which an object stays at one location on the screen for a predetermined time or longer.

The analysis unit 104 creates metadata (first metadata) for each frame using the obtained object and event, and the creation time of a corresponding image. Since an event may not be detected in all frames, metadata is associated with a frame in which an event has been detected. The data size of the frame is described at the beginning of the metadata.

The processing of the analysis unit 104 is not limited to the above-described one, and may be any processing of creating metadata by analyzing an image, such as moving object tracking using an inter-frame subtraction method or optical flow. In this embodiment, the analysis unit 104 acquires a gray image from the encoding unit 103. The present invention, however, is not limited to this, and the analysis unit 104 may use an image directly acquired from the image acquisition unit 101.

In response to a user operation, or the like, the parameter setting unit 105 receives an upper limit value associated with metadata and encoded images to be temporarily stored in the temporary storage unit 106. More specifically, the upper limit value indicates a file upper limit value and a layer upper limit number for each layer. The file upper limit value represents a data amount, time, or the like, to be temporarily stored, and is set for encoded images or metadata. The layer and the layer upper limit number for each layer are required when the recording control unit 108 records information, and will be described in detail later.

Furthermore, in response to a user operation, or the like, the parameter setting unit 105 receives a summary information filter. The summary information filter is used to specify contents to be described in summary information to be created by the summary information creation unit 107 (to be described later), and is at least one piece of information described in the metadata.

The temporary storage unit 106 associates the image ID assigned by the image acquisition unit 101 with the encoded image created by the encoding unit 103 and the metadata created by the analysis unit 104, and temporarily stores them. If the amount of the temporarily stored encoded images or metadata exceeds the aforementioned file upper limit value, the temporary storage unit 106 groups the stored encoded images and metadata, and outputs them to the summary information creation unit 107. After that, the temporarily stored encoded images, and the like, are reset.

The summary information creation unit 107 acquires the encoded images and metadata from the temporary storage unit 106, and creates a movie file and summary information (second metadata) based on the acquired encoded images and metadata. In this example, the movie file has an MP4 format, and the size, offset position, and the like, of each encoded image necessary for the MP4 file structure are created, and set in a file having the MP4 format. On the other hand, the summary information includes the range of the stored metadata, the presence/absence of an event, the number of objects, and position information of each object, and is created according to the settings of the aforementioned summary information filter.

FIG. 2 shows an example of the summary information described in the XML format. FIG. 2 shows a case in which the range of metadata (range), the presence/absence or number of events (event), the attribute and number of objects (human), and the position information of objects (area) are set in the summary information filter. The summary information filter is not limited to these pieces of information, and may be set based on information such as the creation time of the summary information, the occurrence time of each event, and the occurrence period of each event.

The range of the metadata indicates a range of the stored metadata on the time axis using the image IDs assigned by the image acquisition unit 101. That is, the range includes the image IDs of the first and last images of the group. In FIG. 2, it includes images from an image with an image ID "1000" to an image with an image ID "1300".

The presence/absence or number of events indicates the presence/absence or number of events for each event type (tripwire event (tripwire) or abandoned event (abandoned)) within the range of the stored metadata. FIG. 2 shows a case in which one tripwire event has been detected and one abandoned event has been detected.

The attribute of each object represents the object detected from a plurality of images output from the temporary storage unit 106. The number of objects is obtained by counting, for each attribute, objects within the range of the stored metadata. FIG. 2 shows a case in which four males, three females, two cats, and four other objects have been detected.

The position information of objects indicates a sum set of positions (coordinates) on the screen where the objects are detected within the range of the stored metadata. Referring to FIG. 2, in area 1 with x coordinates of 400 to 580 and y coordinates of 50 to 130, a human and another object have been detected, and an abandoned event has been detected. Furthermore, referring to FIG. 2, in area 2 with x coordinates 0 to 170 and y coordinates of 230 to 320, a human and an animal have been detected and a tripwire event has been detected.

As an example different from that shown in FIG. 2, if only the range of metadata and the presence/absence of events are set as a summary information filter, only the range of metadata and the presence/absence of events are described in summary information.

Figure 3A:
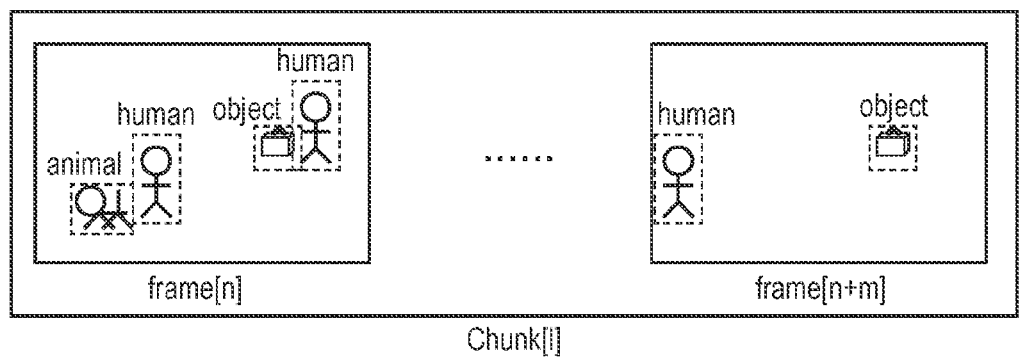
FIG. 3A and FIG. 3B are views showing an example of a method of creating summary information.
Figure 3B:
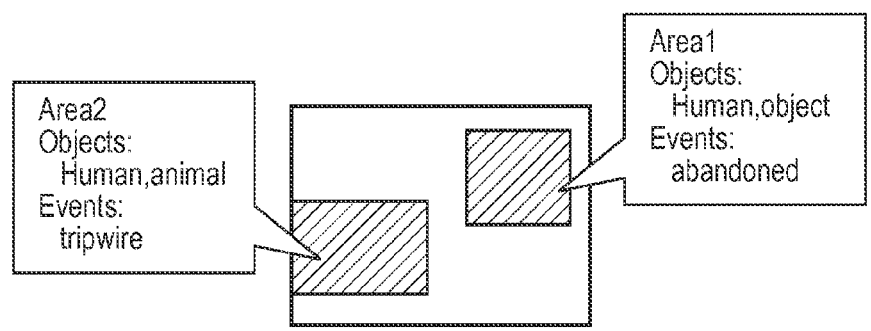

FIG. 3A and FIG. 3B show an example of the gray image (FIG. 3A) and an example of the created summary information (FIG. 3B). In the example shown in FIGS. 3A and 3B, as shown in FIG. 3A, the range of the metadata will be referred to as one chunk section, and the one chunk section includes a plurality of frames. The analysis unit 104 creates metadata for each frame based on the detected objects and events. After frames corresponding to one chunk section elapse, the summary information creation unit 107 creates summary information based on the obtained metadata and encoded images.

This summary information is as shown in FIG. 3B. In this example, the summary information includes pieces of information related to the detected events. More specifically, the summary information indicates that a human and an animal (Human, animal), and a tripwire event (tripwire), have been detected at one position (Area 2). The summary information also indicates that a human and another object (Human, object) and an abandoned event (abandoned) have been detected at another position (Area 1).

That is, assume that the tripwire event has been detected in the nth image within the chunk section and the abandoned event has been detected in the (n+m)th image. The summary information of the chunk section includes information indicating that each of the tripwire event and the abandoned event has been detected in one of the images within the chunk section. The summary information also includes positions where the tripwire event and abandoned event have been detected, and the attributes of the detected objects (human, animal, and other).

If the notification of control information of the camera, such as pan/tilt/zoom (PTZ) information of the camera, is received from the control information acquisition unit 102, pieces of summary information are created. FIG. 4 shows a case in which a PTZ setting change notification is received within the range of one piece of summary information (one chunk section). Referring to FIG. 4, in Chunk n+1 of the stored metadata, the summary information creation unit 107 creates, as summary information s1, metadata from the beginning until the PTZ setting change notification is accepted. The unit 107 creates summary information s2 during a PTZ change period, and creates summary information s3 from when the PTZ change operation ends up to the end of the metadata. As described above, summary information is created for each portion according to a change in control information.

Note that the control information received from the control information acquisition unit 102 is not limited to PTZ information, and may be any control information obtained from the camera, such as a white balance change or an exposure change. The control information of the camera is reflected on summary information.

In this embodiment, the movie file created by the summary information creation unit 107 has the MP4 format. The present invention, however, is not limited to this, and any container that can form one movie from encoded images, such as AVI files, can be used. Furthermore, although the summary information created by the summary information creation unit 107 has the XML format in this embodiment, the present invention is not limited to this, and any format for managing the summary information, such as a binary format or a format having a unique structure, may be possible.

Contents described in the summary information are not limited to those in this embodiment, and may be any contents obtained by summarizing the contents of the metadata within the range of the stored metadata. In this embodiment, a change in control information of the camera is acquired from the control information acquisition unit 102. If, however, the control information exists in the header of an image acquired by the image acquisition unit 101, this information may be used.

The recording control unit 108 hierarchically records, in an external apparatus, the metadata stored in the temporary storage unit 106, the summary information created by the summary information creation unit 107, and movie files, together.

Figure 5:
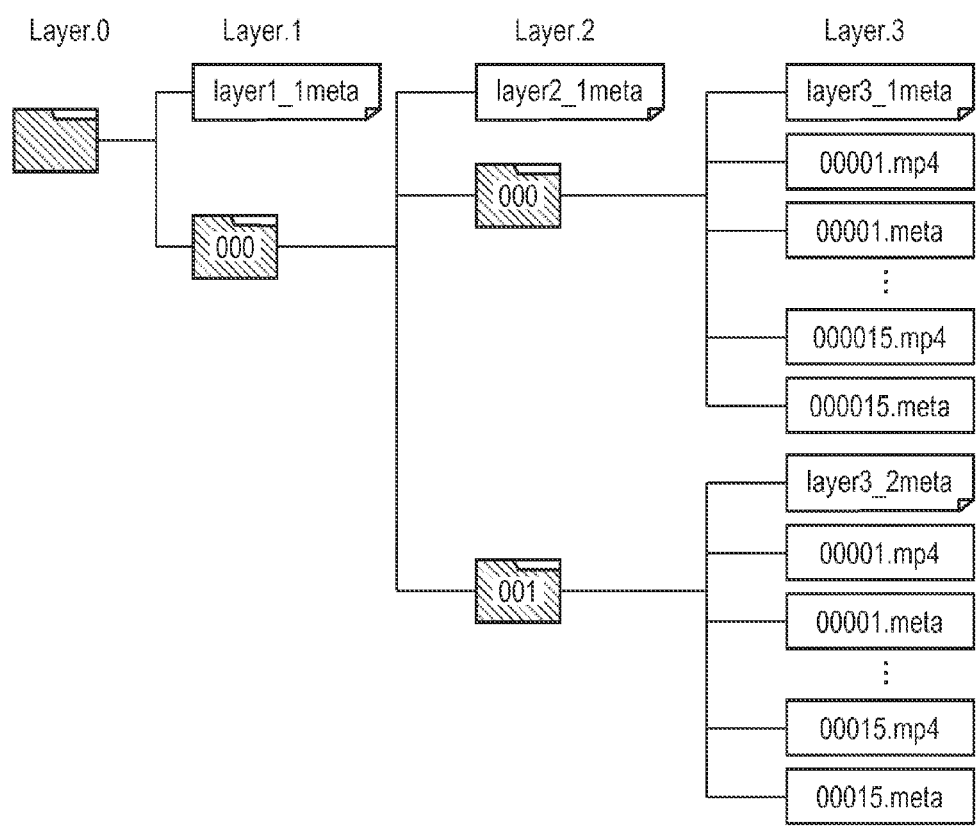
FIG. 5 is a view showing a case in which movie files and concatenated metadata files are hierarchically stored.

FIG. 5 shows a case in which the recording control unit 108 stores, in the external apparatus, MP4 files as movie files, and concatenated metadata files created from metadata. The MP4 file stores, for example, a movie of 5 sec, and the concatenated metadata file stores metadata detected from each of a plurality of images included in the MP4 file in association with each of the plurality of respective images. FIG. 5 shows a case in which there are four layers from Layer 0 to Layer 3. Recording is performed based on the layer upper limit number received by the parameter setting unit 105. The layer upper limit number indicates the upper limit number of files or folders that can be stored in each layer.

Referring to FIG. 5, the layer upper limit number of Layer 3 is fifteen MP4 files or fifteen concatenated metadata files, the layer upper limit number of each of Layer 2 and Layer 1 is set to one thousand folders. Note that the layer upper limit number is not limited to one thousand. An MP4 file and concatenated metadata file have the same name, but different extensions. One file including an MP4 file and concatenated metadata file may be saved in Layer 3.

When saving an MP4 file and concatenated metadata file for the first time, the recording control unit 108 creates one folder in each of Layer 1 and Layer 2. Folder names are 000 to 999 in the folder creation order. An MP4 file and concatenated metadata file are then saved in Layer 3 as the lowest layer.

Layer summary information is created for each layer. If an MP4 file is saved in folder 000 in Layer 2, layer summary information layer3_1meta is generated or updated. If there is no layer summary information layer3_1meta when an MP4 file is saved in folder 000 in Layer 2, layer summary information layer3_1meta is generated. If the layer summary information layer3_1meta exists when an MP4 file is saved in folder 000 in Layer 2, the layer summary information layer3_1meta is updated.

After that, if, when adding a file, the number of files in a folder with a smallest number (000 in FIG. 5) in Layer 2 is smaller than the layer upper limit number, the file is saved in the folder. On the other hand, if the number of files exceeds the layer upper limit number, a new folder is created in Layer 2, and an MP4 file and concatenated metadata file are saved in the new folder.

Note that if the number of a folder name in Layer 2 exceeds 999, a new folder is created in Layer 1, and folders are created as described above, in which an MP4 file and concatenated metadata file are saved. If the number of a folder name in Layer 1 exceeds the upper limit of 999, folder 000 in Layer 1 is deleted, and then files are saved in folder 000 as described above. After that, in a similar manner, a deletion operation is performed and then a saving operation is executed.

Figure 6:
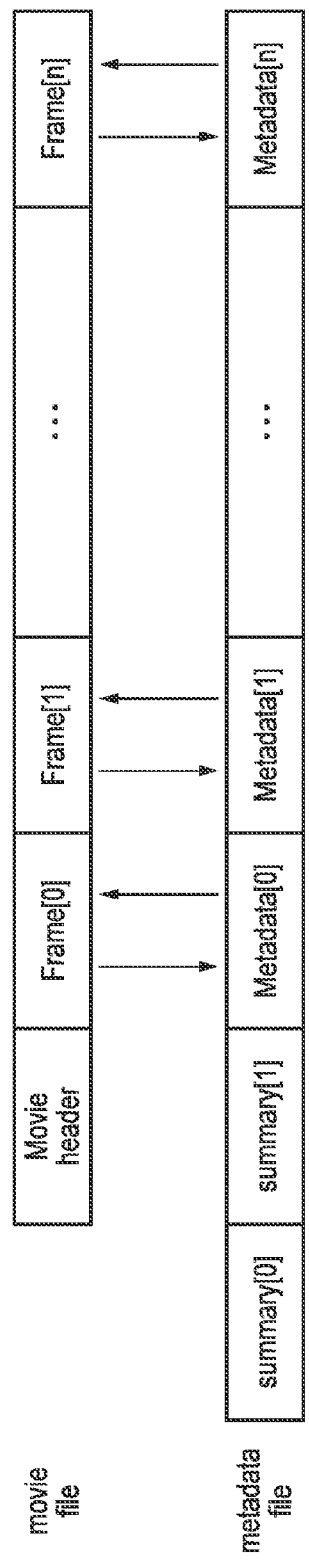
FIG. 6 is a view showing the correspondence between a movie and metadata.

FIG. 6 shows an example of the structure of an MP4 file and concatenated metadata file to be recorded. In the MP4 file (movie file) shown in the upper portion, the header (Movie Header) of the MP4BOX structure is arranged at the beginning, and then encoded images Frame[0] to Frame[n] are continuously arranged. In the concatenated metadata file (metadata file), pieces of summary information summary[0] and summary[1] created by the summary information creation unit 107 are arranged at the beginning, and then metadata Metadata[0] to Metadata[n] stored in the temporary storage unit 106 are continuously arranged after the summary information in association with the encoded images Frame[0] to Frame[n]. The MP4 file and concatenated metadata file with the structure shown in FIG. 6 have the same name and different extensions. This associates the MP4 file with the concatenated metadata file. When the concatenated metadata file is saved, layer summary information is created and updated.

Note that the pieces of summary information summary[0] and summary[1] and the concatenated metadata Metadata[0] to Metadata[n] need not always be recorded as one file, and may be recorded as different files.

Furthermore, the recording control unit 108 creates layer summary information (third metadata) by summarizing pieces of summary information for files or folders belonging to one layer, and updates it every time contents are changed, thereby achieving layer management. For example, in Layer 3, layer summary information for fifteen files is created (for example, layer3_1.meta). In Layer 2, layer summary information for 999 folders in Layer 2 is created (for example, layer2_1.meta).

FIG. 7A and FIG. 7B show examples of layer summary information described in the XML format. In FIG. 7A, an example of the layer summary information (the layer upper limit number is three files) in Layer 3 is shown. In FIG. 7B, an example of the layer summary information (the layer upper limit number is three folders) in Layer 2 is shown. In each piece of layer summary information, the pan/tilt/zoom control information and the presence/absence of events extracted from one or more pieces of summary information stored in one folder are described in the XML format.

The external apparatus in which the recording control unit 108 records a movie and concatenated metadata need only be a medium that can store data, such as an SD card, a hard disk, or an NAS, and is not limited to a specific device.

Figure 8:
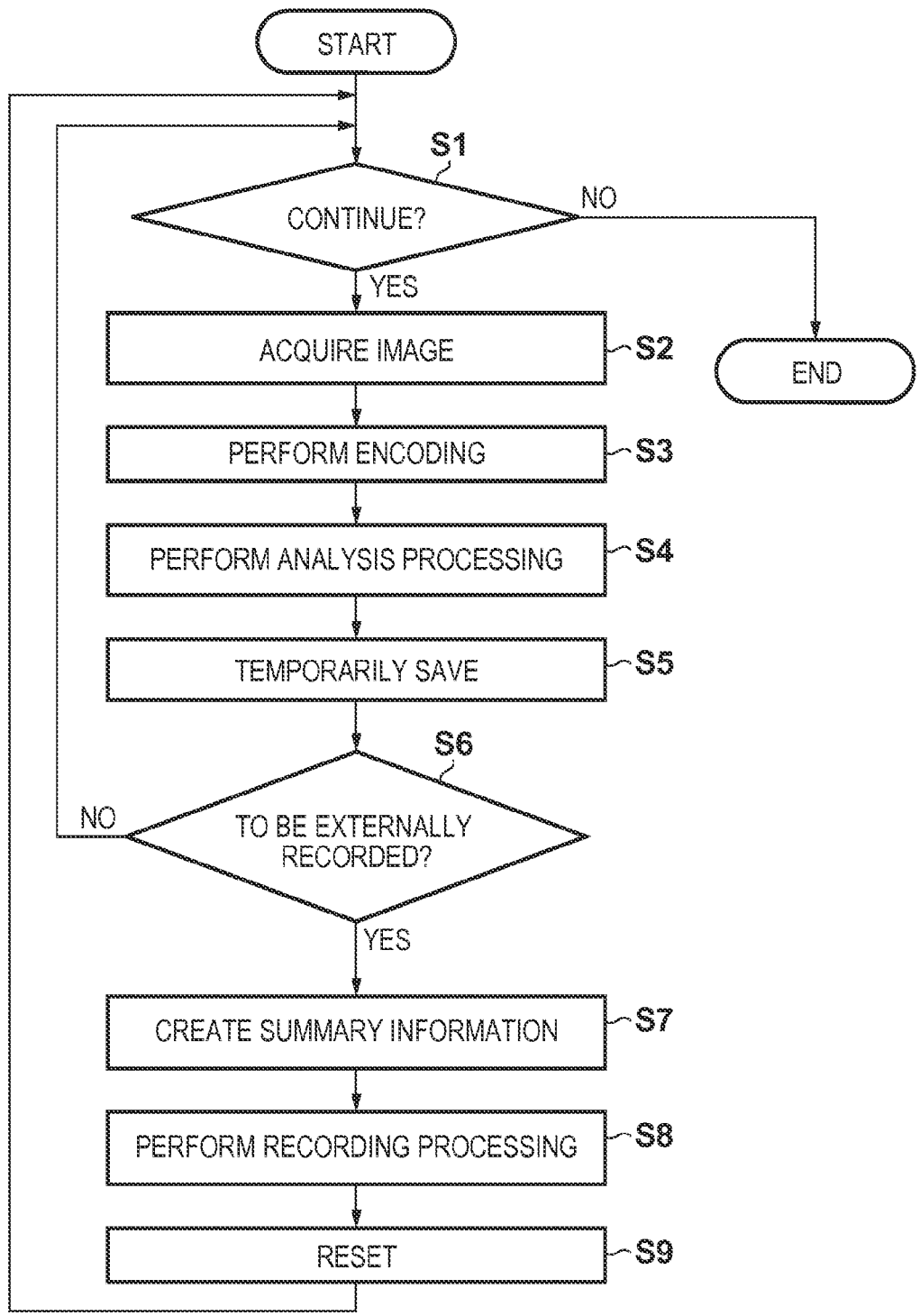
FIG. 8 is a flowchart illustrating storage processing.

FIG. 8 is a flowchart illustrating the above-described storage processing. FIG. 8 shows part of a program executed by a computer for controlling the information processing apparatus 10. This computer reads out a program stored in a memory, and executes the processing shown in FIG. 8.

In step S1, it is determined whether to continue the storage processing. An image is acquired from the image acquisition unit 101 (step S2), and the encoding unit 103 creates an encoded image (step S3). The analysis unit 104 performs analysis processing for the encoded image created in step S3 (step S4), and stores the encoded image and metadata in the temporary storage unit 106 (step S5). If the number of encoded images or metadata stored in the temporary storage unit 106 is smaller than the file upper limit number, the process returns to the determination processing in step S1 (step S6). On the other hand, if the number of encoded images or metadata exceeds the file upper limit number, the summary information creation unit 107 creates summary information (step S7), and performs recording processing under the control of the recording control unit 108 (step S8). The temporary storage unit 106 is then reset, and the process returns to the determination processing in step S1 (step S9).

Figure 9:
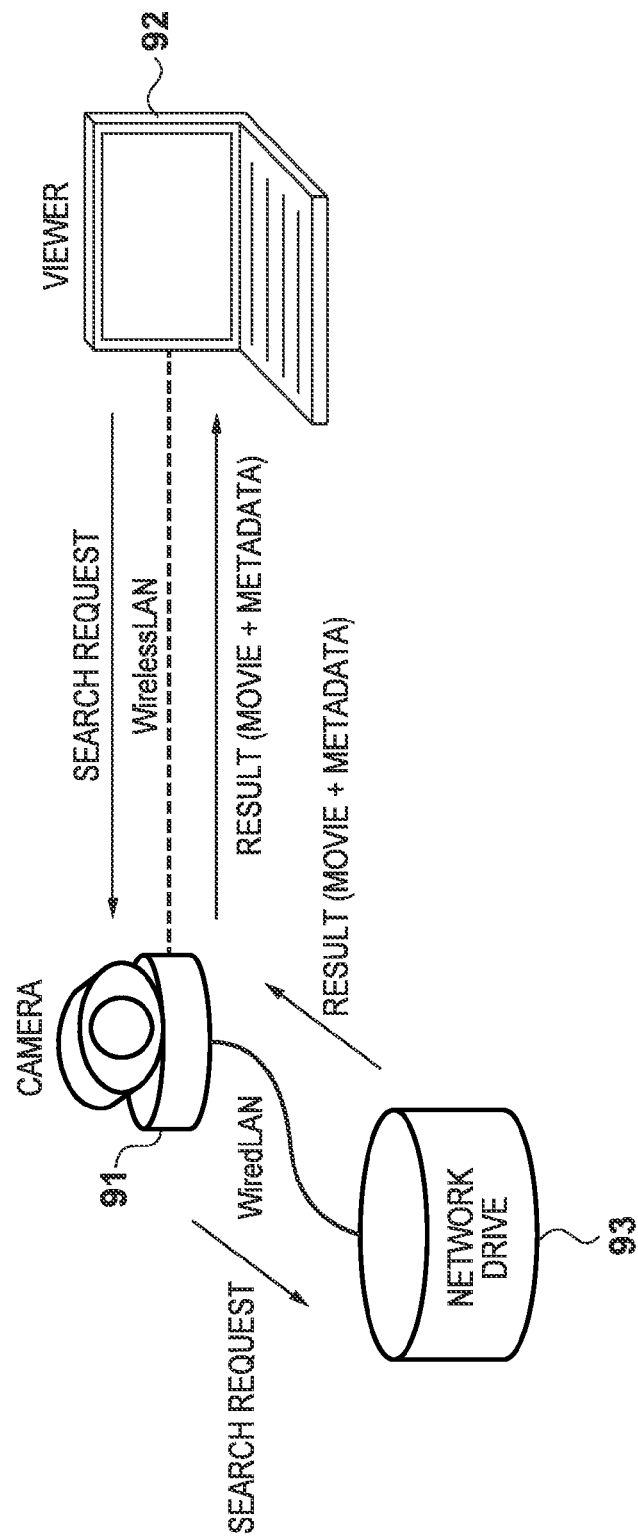
FIG. 9 is a view showing a recording system.

FIG. 9 shows a recording system using the information processing apparatus according to this embodiment, and the operation of the recording system. Referring to FIG. 9, a camera 91 and a viewer 92 are connected to each other by a wireless LAN, and the camera 91 and a network drive 93 are connected to each other by a wired LAN. The information processing apparatus according to this embodiment is mounted on the camera 91. The information processing apparatus according to this embodiment directly acquires an image from the camera 91, performs processing according to this embodiment, and outputs a result to the network drive 93 to store it.

To play back only a movie in which an event has occurred, the viewer 92 transmits a search message to the camera 91. Upon accepting the search message, the camera 91 searches the network drive 93. For example, if the tripwire event is searched for, the presence/absence of the tripwire event is checked sequentially from layer summary information in the highest layer of the hierarchical structure of the network drive 93. If the tripwire event exists, layer summary information in a lower layer is checked. If the network drive 93 checks the presence/absence of the tripwire event from summary information attached to metadata, and finds the event, it transmits a movie corresponding to a portion where the event has occurred, and its metadata to the viewer 92 via the camera 91. The system arrangement is not limited to this, and the information processing apparatus may be mounted on the network drive 93.

As described above, by hierarchically saving movie files and concatenated metadata files according to the aforementioned arrangement, it is possible to improve the efficiency of a search process by hierarchically tracing the metadata. Note that, in this embodiment, a case in which movie files are saved has been explained. The present invention is not limited to this, and is applicable to image files including still image files.

Figure 10:
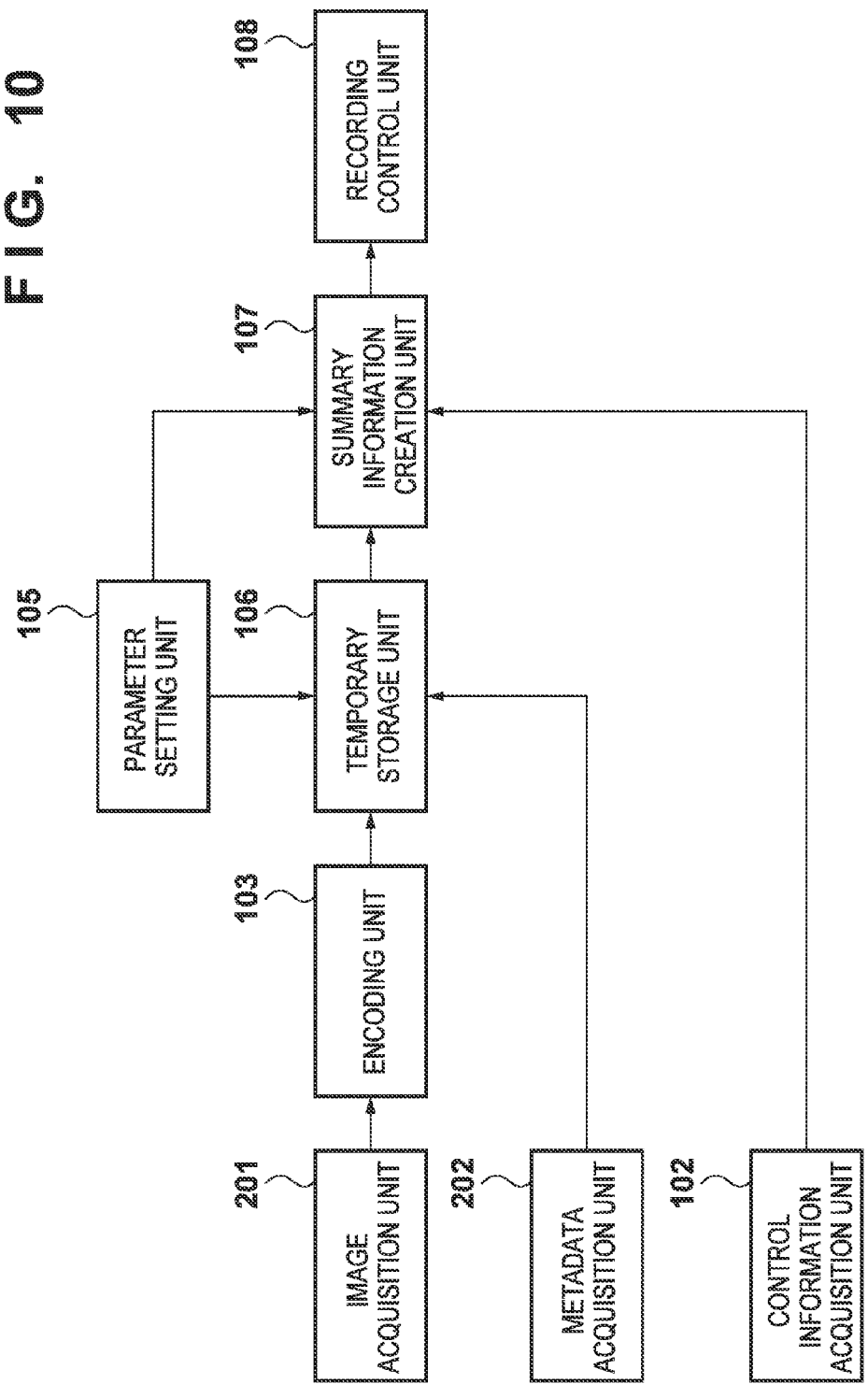
FIG. 10 is block diagram showing the arrangement of an information processing apparatus.

FIG. 10 is a block diagram showing the arrangement of a recording apparatus according to the second embodiment. This arrangement is basically the same as that shown in FIG. 1, except that an image acquisition unit 201 and metadata acquisition unit 202 are included. The image acquisition unit 201 acquires images captured by an external imaging apparatus, and image IDs that have been assigned to the images by an external apparatus. The imaging apparatus and the apparatus for assigning an image ID may be a single apparatus or different apparatuses.

The metadata acquisition unit 202 acquires metadata and image IDs corresponding to them from the external apparatus. The image IDs of the externally acquired images and those of the metadata need not be in a one-to-one correspondence with each other, but an image and metadata corresponding to each ID may have the same amount or time unit, as shown in FIG. 6.

When temporarily storing an image, image ID, and metadata in association with each other in a temporary storage unit 106, if there is no image having an image ID corresponding to the metadata, an image having a close image ID is associated with the metadata. Similarly, if there is no metadata with the image ID of metadata corresponding to the image, an image having the image ID of nearby metadata is associated with the metadata. Another arrangement is the same as that described in the first embodiment, and recording control is executed for the externally acquired images and metadata.

Although the embodiments have been explained in detail, the present invention can take, for example, a form of a system, an apparatus, a method, a program, a recording medium (storage medium), or the like. More specifically, the present invention may be applied to a system including a plurality of devices (for example, a host computer, interface device, imaging apparatus, and web application) or an apparatus including a single device.

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiments of the present invention, and by a method performed by the computer of the system or an apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image management apparatus comprising:
   at least one processor operatively coupled to a memory, serving as:
   (a) an obtaining unit configured to obtain a plurality of metadata corresponding to a plurality of image data, respectively; and
   (b) a generation unit configured (i) to generate, from the plurality of metadata respectively corresponding to the plurality of image data, a plurality of first summary metadata, each of which summarizes each of a plurality of groups of metadata into which the plurality of metadata are grouped, and (ii) to generate, from the plurality of first summary metadata, second summary metadata that summarizes the plurality of first summary metadata.

2. The apparatus according to claim 1, wherein each of the plurality of metadata includes first attribute data and second attribute data, and each of the plurality of first summary metadata includes summary data of the first attribute data and summary data of the second attribute data.

3. The apparatus according to claim 1, wherein each of first metadata corresponding to first image data and second metadata corresponding to second image data indicates a presence of an event detected in a corresponding one of the first image data and the second image data, and one of the plurality of first summary metadata including the first metadata and the second metadata indicates a presence of an event detected in one of the plurality of image data including the first image data and the second image data.

4. The apparatus according to claim 1, wherein each of first metadata corresponding to first image data and second metadata corresponding to second image data indicates a type of an event detected in a corresponding one of the first image data and the second image data, and one of the plurality of first summary metadata, which summarizes one of the plurality of groups of metadata including the first metadata and the second metadata, indicates a type of an event detected in a group of image data including the first image data and the second image data.

5. The apparatus according to claim 1, wherein each of first metadata corresponding to first image data and second metadata corresponding to second image data indicates a position of an object detected in a corresponding one of the first image data and the second image data, and one of the plurality of first summary metadata including the first metadata and the second metadata indicates a position of an object detected in one of the plurality of image data including the first image data and the second image data.

6. The apparatus according to claim 1, wherein each of first metadata corresponding to first image data and second metadata corresponding to second image data indicates a presence of an abandoned event detected in a corresponding one of the first image data and the second image data, and one of the plurality of first summary metadata including the first metadata and the second metadata indicates a presence of an abandoned event detected in one of the plurality of image data including the first image data and the second image data.

7. The apparatus according to claim 1, wherein said generation unit generates a first one of the plurality of first summary metadata from a first group of metadata, and generates a second one of the plurality of first summary metadata from a second group of metadata, and stores the first one of the plurality of first summary metadata in association with the first group of metadata, and stores the second one of the plurality of first summary metadata in association with the second group of metadata.

8. The apparatus according to claim 1, further comprising a determination unit configured to determine, based on the plurality of first summary metadata and the second summary metadata, whether there exists image data satisfying a condition, among the plurality of image data respectively corresponding to a plurality of metadata.

9. The apparatus according to claim 1, wherein, according to a change in state of an imaging unit for shooting an image, said generation unit generates, from the plurality of metadata respectively corresponding to a plurality of images shot by the imaging unit before the state changes, one of the plurality of first summary data.

10. The apparatus according to claim 1, wherein said generation unit generates, from the plurality of metadata respectively corresponding to the plurality of image data forming a video image, the plurality of first summary metadata.

11. A management method for an image management apparatus, the method comprising:
   generating, from a plurality of metadata respectively corresponding to a plurality of image data, a plurality of first summary metadata, each of which summarizes each of a plurality of groups of metadata into which the plurality of metadata are grouped; and
   generating, from the plurality of first summary metadata, second summary metadata that summarizes the plurality of first summary metadata.

12. The method according to claim 11, wherein each of the plurality of metadata includes first attribute data and second attribute data, and one of the plurality of first summary metadata includes summary data of the first attribute data and summary data of the second attribute data.

13. The method according to claim 11, wherein each of first metadata corresponding to first image data and second metadata corresponding to second image data indicates the presence of an event detected in a corresponding one of the first image data and the second image data, and one of the plurality of first summary metadata including the first metadata and the second metadata indicates the presence of an event detected in one of the plurality of image data including the first image data and the second image data.

14. The method according to claim 11, further comprising determining, based on the plurality of first summary metadata and the second summary metadata, whether there exists image data satisfying a condition, among the plurality of image data respectively corresponding to a plurality of metadata.

15. The method according to claim 11, further comprising generating, according to a change in state of an imaging unit for shooting an image, from a plurality of metadata respectively corresponding to a plurality of images shot by the imaging unit before the state changes, one of the plurality of first summary data.

16. A non-transitory storage medium storing a computer program executed by an image management apparatus, the computer program comprising:
  generating, from a plurality of metadata respectively corresponding to a plurality of image data, a plurality of first summary metadata, each of which summarizes each of a plurality of groups of metadata into which the plurality of metadata are grouped; and
  generating, from the plurality of first summary metadata, second summary metadata that summarizes the plurality of first summary metadata.

17. The medium according to claim 16, wherein each of the plurality of metadata includes first attribute data and second attribute data, and one of the plurality of first summary metadata includes summary data of the first attribute data and summary data of the second attribute data.

18. The medium according to claim 16, wherein each of first metadata corresponding to first image data and second metadata corresponding to second image data indicates the presence of an event detected in a corresponding one of the first image data and the second image data, and one of the plurality of first summary metadata including the first metadata and the second metadata indicates the presence of an event detected in one of the plurality of image data including the first image data and the second image data.

19. The medium according to claim 16, wherein the computer program includes determining, based on the plurality of first summary metadata and the second summary metadata, whether there exists image data satisfying a condition, among the plurality of image data respectively corresponding to a plurality of metadata.

20. The medium according to claim 16, wherein the computer program includes generating, according to a change in state of an imaging unit for shooting an image, from a plurality of metadata respectively corresponding to a plurality of images shot by the imaging unit before the state changes, one of the plurality of the first summary data.

21. The method according to claim 11, wherein each of first metadata corresponding to first image data and second metadata corresponding to second image data indicates a type of an event detected in a corresponding one of the first image data and the second image data, and one of the plurality of the first summary metadata, which summarizes one of the plurality of groups of metadata including the first metadata and the second metadata, indicates a type of an event detected in a group of image data including the first image data and the second image data.

22. The medium according to claim 16, wherein each of first metadata corresponding to first image data and second metadata corresponding to second image data indicates a type of an event detected in a corresponding one of the first image data and the second image data, and one of the plurality of the first summary metadata, which summarizes one of the plurality of groups of metadata including the first metadata and the second metadata, indicates a type of an event detected in one of the plurality a group of image data including the first image data and the second image data.

* * * * *